(12) United States Patent
Niwa et al.

(10) Patent No.: US 7,273,128 B2
(45) Date of Patent: Sep. 25, 2007

(54) VIBRATION PROOFING HEAT SHIELD PLATE

(75) Inventors: Takahiro Niwa, Yokohama (JP); Shuichi Ishiwa, Yokohama (JP); Hiroto Sugai, Yokohama (JP); Kazuyo Akimoto, Toyonaka (JP); Kazuaki Mishima, Toyonaka (JP)

(73) Assignees: Nichias Corporation, Tokyo (JP); Sanwa Packing Industry Co., Ltd., Toyonaka-shi (JP)

( * ) Notice: Subject to any disclaimer, the term of this patent is extended or adjusted under 35 U.S.C. 154(b) by 355 days.

(21) Appl. No.: 10/971,134

(22) Filed: Oct. 25, 2004

(65) Prior Publication Data

US 2005/0139416 A1    Jun. 30, 2005

(30) Foreign Application Priority Data

Oct. 29, 2003    (JP) .............................. 2003-368453

(51) Int. Cl.
| | |
|---|---|
| F16F 15/06 | (2006.01) |
| F16F 1/18 | (2006.01) |
| F16F 9/54 | (2006.01) |
| F16M 13/02 | (2006.01) |
| F16F 15/04 | (2006.01) |
| F16F 7/00 | (2006.01) |
| F16M 13/00 | (2006.01) |

(52) U.S. Cl. ................. 181/209; 181/207; 267/140.11; 267/140.4; 248/610; 248/612

(58) Field of Classification Search ................ 181/207, 181/209, 240, 204, 205; 267/140.11, 136, 267/140.3, 140.4, 141, 141.1–141.7; 248/610, 248/612, 634, 635

See application file for complete search history.

(56) References Cited

U.S. PATENT DOCUMENTS

| | | | | | |
|---|---|---|---|---|---|
| 1,935,364 | A | * | 11/1933 | Langen | 267/2 |
| 1,941,763 | A | * | 1/1934 | Swennes | 248/570 |
| 2,432,717 | A | * | 12/1947 | Berger | 267/162 |
| 3,002,740 | A | * | 10/1961 | Van Hulst | 267/165 |
| 3,028,138 | A | * | 4/1962 | Wells | 248/619 |
| 3,107,905 | A | * | 10/1963 | Lucas | 267/161 |
| 3,226,026 | A | * | 12/1965 | Ulrich et al. | 236/59 |
| 3,279,779 | A | * | 10/1966 | Kloss et al. | 267/153 |
| 3,489,402 | A | * | 1/1970 | Cobley | 267/152 |

(Continued)

FOREIGN PATENT DOCUMENTS

JP    56-17313    7/1954

(Continued)

*Primary Examiner*—Edgardo San Martin
(74) *Attorney, Agent, or Firm*—Oblon, Spivak, McClelland, Maier & Neustadt, P.C.

(57) ABSTRACT

A vibration proofing heat shield plate fixed such as to cover at least a part of a heat source while forming a gap with respect to a surface of the heat source is provided with a vibration proofing heat shield plate main body portion, a collar member positioned at an open hole of the vibration proofing heat shield plate main body portion and provided with a pair of locking pieces fastened by bolt to the heat source, a washer member in which a portion interposed between a pair of locking pieces of the collar member is formed in an approximately C-shaped cross section, and a joint member joining the washer member and the vibration proofing heat shield plate main body.

3 Claims, 2 Drawing Sheets

U.S. PATENT DOCUMENTS

| | | | |
|---|---|---|---|
| 3,508,020 A * | 4/1970 | Culver | 200/83 R |
| 6,318,734 B1 * | 11/2001 | Boskamp | 277/598 |
| 6,561,312 B2 * | 5/2003 | Stanienda | 181/207 |
| 6,581,720 B1 * | 6/2003 | Chen et al. | 181/205 |
| 6,786,298 B1 * | 9/2004 | Chang et al. | 181/207 |
| 7,065,963 B2 * | 6/2006 | Niwa | 60/323 |
| 2005/0028519 A1 * | 2/2005 | Ishiwa | 60/323 |
| 2005/0140075 A1 * | 6/2005 | Mishima | 267/140.11 |

FOREIGN PATENT DOCUMENTS

| | | | |
|---|---|---|---|
| JP | 4-71733 | | 6/1992 |
| JP | 2000329192 A | * | 11/2000 |
| JP | 2002113525 A | * | 4/2002 |
| JP | 2002235800 A | * | 8/2002 |
| JP | 2004092543 A | * | 3/2004 |

* cited by examiner

VIBRATION PROOFING HEAT SHIELD PLATE

BACKGROUND OF THE INVENTION

1. Technical Field

The present invention relates to a vibration proofing heat shield plate, for example, arranged around an exhaust manifold of an automotive engine.

2. Background Art

As shown in FIG. 3, a combustion exhaust gas having a high temperature reaching some hundreds of degree flows through an inner portion of an exhaust manifold 101 of an automotive engine 100 in accordance with an operation of the engine 100. Accordingly, in order to prevent heat and vibration generated from the exhaust manifold 101 from being radiated into an engine room and an external portion of a vehicle, a vibration proofing heat shield plate 102 is provided around the exhaust manifold 101. When directly mounting the vibration proofing heat shield plate 102 to the exhaust manifold 101 by a bolt 103, the heat and the vibration of the exhaust manifold 101 are transmitted to the vibration proofing heat shield plate 102, and an effect obtained by placing the vibration proofing heat shield plate 102 is reduced. Accordingly, the exhaust manifold 101 and the vibration proofing heat shield plate 102 are joined via a buffering member (not shown).

In Japanese Unexamined Utility Model Publication No. 56-17313, there is disclosed a heat shield plate in which a wire mesh member is arranged in a mounting portion to a vibration source, and the wire mesh member is integrally joined to a heat resisting metal plate. In Japanese Unexamined Utility Model Publication No. 4-71733, there is disclosed a heat shield plate in which the heat shield plate is constituted by inner and outer metal plates, and a heat resisting mesh interposed between the metal plates approximately all around an entire surface, the mesh is exposed by notching the metal plate around a mounting portion of the heat shield plate, and the mesh in the exposed portion is mounted to a fixed member. In accordance with the heat shield plate, although it is possible to control a vibration of the vibration source, it is not possible to obtain a sufficient satisfaction for shielding the heat radiation from the exhaust manifold, and it is unstable to mount to the vibration source. As a structure for solving the problem, there has been known a heat shield plate in which two rigid members each having a flange member (a locking piece) protruding to a horizontally outer side from one end of a circular cylinder member (sleeve) are prepared, a collar member is structured by bringing another ends of the circular cylinder members into contact with each other, and a wire mesh member in which holes being larger than an outer diameter of the circular cylinder member and smaller than an outer diameter of the flange member are pierced, is mounted to the circular cylinder member in a loosely fitted state. In accordance with the heat shield plate, the collar member is strongly fastened by bolt to a predetermined fixed place of the vibration source, the joint between the collar member and the wire mesh member is achieved in the loosely fitted state, and the contact portion between both the elements is partly formed and fluctuated, so that a heat shielding effect is high.

DISCLOSURE OF THE INVENTION

However, in the heat shield plate having the high heat shielding effect as mentioned above, the collar member and the wire mesh member come into collision with each other due to a lateral vibration of the exhaust manifold, whereby there are generated problems that a noise is generated and the wire mesh member is damaged.

SUMMARY OF THE INVENTION

Accordingly, an object of the present invention is to provide a vibration proofing heat shield plate in which no noise is generated by vibration of the exhaust manifold, and a heat shielding effect and a vibration proofing effect are high.

In other words, the present invention solves the conventional problems mentioned above, and provides a vibration proofing heat shield plate fixed such as to cover at least a part of a heat source fixed to a vibration source while forming a gap with respect to a surface of the heat source for reducing a heat radiation from the heat source, comprising:

a vibration proofing heat shield plate main body portion;

a collar member positioned at an open hole of the vibration proofing heat shield plate main body portion and provided with a pair of locking pieces fastened by bolt to the heat source;

a washer member in which a portion interposed between a pair of locking pieces of the collar member is formed in an approximately C-shaped cross section; and a joint member joining the washer member and the vibration proofing heat shield plate main body.

In accordance with the vibration proofing heat shield plate on the basis of the present invention, no noise is generated by the vibration from the vibration source, and the vibration can be absorbed by the washer member so as to achieve a high vibration controlling effect. Further, since the contact between the heat source and the washer member is mainly achieved by a linear contact, a thermal conduction is shielded and a high heat shielding effect can be obtained.

DESCRIPTION OF THE PREFERRED EMBODIMENTS

Figure 1:
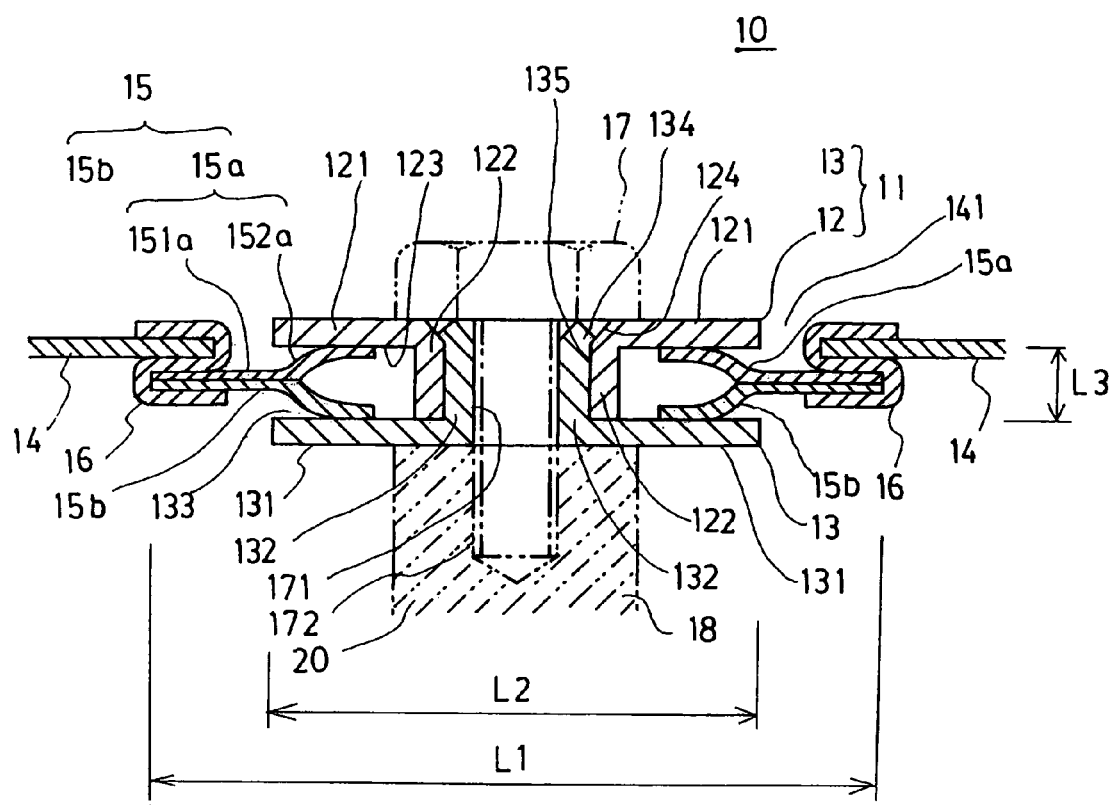
FIG. 1 is a vertical cross sectional view showing a buffering member portion of a vibration proofing heat shield plate of an embodiment of the present invention.

Next, a description will be given of a vibration proofing heat shield plate of an embodiment of the present invention with reference to FIGS. 1 and 2. In this case, in the present specification, upper and lower mean upper and lower in the drawings for convenience of explanation.

In the present invention, a vibration source can be exemplified by a motor vehicle and an exhaust manifold attached to the motor vehicle. Further, a heat source can be exemplified by the exhaust manifold of the motor vehicle. A vibration proofing heat shield plate 10 is fixed such as to cover at least a part of an exhaust manifold 20 while forming a gap with respect to a surface of the exhaust manifold 20 for reducing a heat radiation from the exhaust manifold 20 of an automotive engine.

The vibrating proofing heat shield plate 10 is provided with a vibration proofing heat shield plate main body portion 14, a collar member 11 positioned at an open hole of the vibration proofing heat shield plate main body portion 14 and provided with a pair of locking pieces 12 and 13 fastened by bolt to the heat source 20, a washer member 15 in which a portion interposed between a pair of locking pieces 12 and 13 of the collar member 11 is formed in an approximately C-shaped cross section, and a joint member 16 joining the washer member 15 and the vibration proofing heat shield plate main body 14.

In the present invention, the collar member provided with a pair of locking pieces can be exemplified by a structure having an outer collar member constituted by a circular cylinder member and a collar-shaped locking piece formed in one end of the circular cylinder member, and an inner collar member constituted by a circular cylinder member and a collar-shaped locking piece formed in one end of the circular cylinder member, in which the outer collar member and the inner collar member are arranged such that another ends of the circular cylinder members are opposed to each other, and are fitted by inserting the circular cylinder members to each other. As an aspect that the circular cylinder members are inserted such that another ends of the circular cylinder members are opposed to each other, there can be listed up an aspect that the circular cylinder member of the outer member is inserted to a hole of the circular cylinder member of the inner collar member, and an aspect that the circular cylinder member of the inner collar member is inserted to a hole of the circular cylinder member of the outer collar member. The inner collar member means a partial collar member in which the locking piece is positioned in a heat source side of the vibration proofing heat shield plate main body, and the outer collar member means a partial collar member in which the locking piece is positioned in an opposite side to the heat source of the vibration proofing heat shield plate main body. Further, in a state in which the vibration proofing heat shield plate is fastened by bolt to the heat source, it is preferable in view of setting a joint force with the washer member to be proper, to bring an end surface of the circular cylinder member of the collar member having a larger diameter of the circular cylinder member into contact with a back surface of the locking piece of another collar member so as to prevent the washer member from being fastened too excessive. In this case, a leading end portion of the circular cylinder member of the outer collar member or the inner collar member may be bent so as to stabilize mating of the collar members. A description will be given below of an aspect that the circular cylinder member of the inner collar member is inserted to the hole of the circular cylinder member of the outer collar member.

Figure 2:
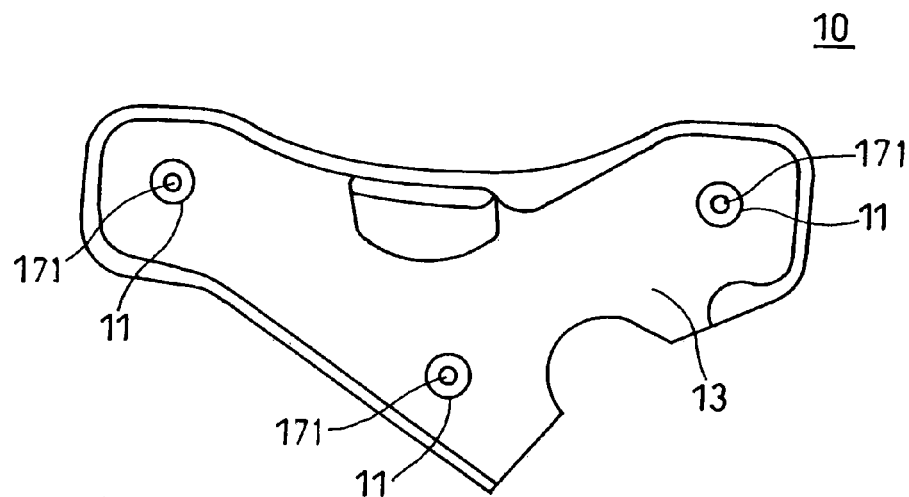
FIG. 2 is a view of the vibration proofing heat shield plate of the present embodiment as seen from a front face.
Figure 3:
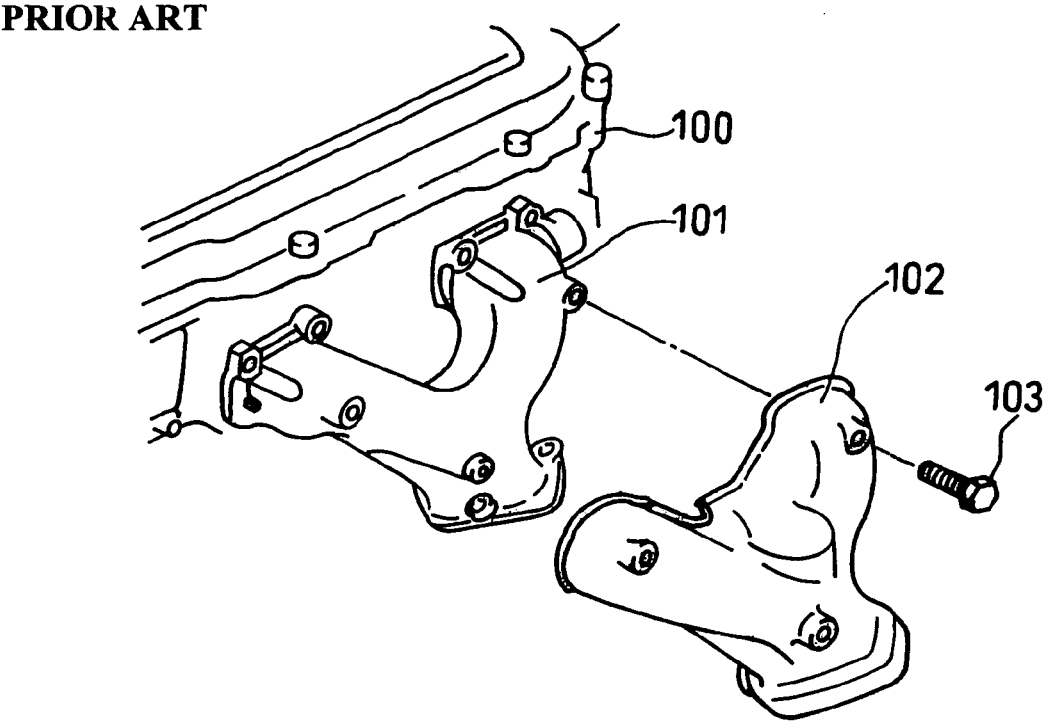
FIG. 3 is a view explaining an installing method of a conventional vibration proofing heat shield plate and an exhaust manifold.

In FIG. 1, the inner collar member 13 is provided with a circular cylinder member 132 having a bolt hole 171 through which a bolt 17 is inserted, and a collar-shaped locking piece 131 protruding horizontally to an outer side from a lower end portion of the circular cylinder member 132. The bolt hole 171 has a diameter which is a little larger than an outer diameter of the bolt 17, whereby the bolt 17 can be inserted with no resistance. An upper surface 133 of the locking piece 131 of the inner collar member 13 is formed in a planer shape so as to be brought into contact with a lower member having an approximately C-shaped cross section in the washer member 15. Further, a length (a height) of the circular cylinder member 132 of the inner collar member 13 is longer than a length (a height) of a circular cylinder member 122 of the outer collar member 12, and a leading end portion 134 of the circular cylinder member 132 is bent slightly to an outer side.

The outer collar member 12 is provided with the circular cylinder member 122 having an insertion hole 135 through which the circular cylinder member 132 of the inner collar member 13 is inserted, and a collar-shaped locking piece 121 protruding horizontally to an outer side from an upper end portion of the circular cylinder member 122. It is preferable to set an inner diameter of the insertion hole 135 to a level which is slightly larger than the outer diameter of the circular cylinder member 132 of the inner collar member 13 in view of an easy insertion and a slack prevention. A back surface 123 of the locking piece 121 of the outer collar member 12 is formed in a planner shape so as to be brought into contact with the upper member having the approximately C-shaped cross section in the washer member 15. A length of the circular cylinder member 122 of the outer collar member 12 is set to such a length that a leading end of the circular cylinder member 122 is brought into contact with the upper surface 133 of the locking piece 131 of the inner collar member 13 in a state in which the vibration proofing heat shield plate 10 is fastened by bolt to the heat source 20. Further, an outer angle of a joint portion between the circular cylinder member 122 and the locking piece 121 is chamfered, and is set in a mating state to the leading end portion of the circular cylinder member 132 of the inner collar member 13.

In the collar member 11, a diameter L2 of both the locking pieces 121 and 131 is set to such a level that the approximately C-shaped cross section portion of the washer member 15 can be inserted to a gap between both the locking pieces 121 and 131, and around the circular cylinder member 122 of the outer collar member 12. Further, the gap L3 between both the locking pieces 121 and 131 is set to such a level that the approximately C-shaped cross section portion of the washer member 15 is inserted thereto, and a spring energizing force of the washer member 15 is applied thereto.

Known shape and working method can be applied to the vibration proofing heat shield plate main body portion 14. A hole 141 having a diameter L1 to which the collar member 11 or the like is mounted is formed in the vibration proofing heat shield plate main body portion 14. The hole 141 is formed at a position opposing to a mounting portion 18 of the exhaust manifold at a time of mounting the vibration proofing heat shield plate 10 to the exhaust manifold. A magnitude of the diameter L1 is slightly larger than the diameter of the locking pieces 121 and 131 of the collar member 11. Accordingly, it is possible to mount the washer member 15 between a pair of locking pieces 121 and 131, and it is possible to join the washer 15 to the vibration proofing heat shield plate main body portion 14 via the joint member 16. Further, a female screw 172 screwed with the bolt 17 is formed in the mounting portion 18 of the exhaust manifold.

The washer member 15 is structured such that a hole side (an inner side) is formed in an annular shape having an approximately C-shaped cross section, and an outer side is formed in a flat annular shape connected to the annular shape having the approximately C-shaped cross section. The washer member 15 is structured, for example, such that two deformed washers each having an upward or downward bent hole side are assembled in a vertically linear symmetric shape by bringing outer annular flat portions into contact with each other. Accordingly, the washer member 15 may be constituted by an integral structure in which the annular portions of the flat plates are previously joined, or may be constituted by a structure assembled by simply bringing the annular portions of the flat plates into contact with each other. However, the structure assembled by simply bringing the annular portions of the flat plates into contact with each other is preferable in view that a joining step is not required. A material of the washer member 15 can employ a steel material having an elasticity.

The joint member 16 joining the washer member 15 and the vibration proofing heat shield plate main body portion 14 is not particularly limited, however, employs a ring-like member having an approximately S-shaped cross section in the present embodiment. In other words, a root portion in a lower side of the approximately S-shaped portion is fitted to an annular flat plate portion 151a of the washer member 15, and a root portion in an upper side of the approximately S-shaped portion is fitted to an open hole edge of the vibration proofing heat shield plate main body portion 14. Further, the root portion in the lower side of the approximately S-shaped portion is fitted to the open hole edge of the vibration proofing heat shield plate main body portion 14, and the root portion in the upper side is fitted to the annular flat plate portion 151a of the washer member 15.

Next, a description will be given of an example of a method of mounting a buffering member constituted by the collar member 11, the washer member 15 and the joint member 16 to the vibration proofing heat shield plate main body portion 14 with reference to FIG. 1. A hole 141 having a diameter L1 is pierced in a predetermined position of the vibration proofing heat shield plate main body portion 14. First, two deformed washers 15a and 15b each having an upward bent inner side are assembled in a vertically linear symmetric shape by bringing annular flat plate portions 151a and 151b into contact with each other, and next, the annular flat portion in the outer side of the washer member 15 is fitted to one root portion of the S-shaped portion of the joint member 16. Next, the open hole edge of the vibration proofing heat shield plate main body portion 14 is fitted to another root portion of the S-shaped portion of the joint member 16, and is caulked by pressing the joint member 16 from both the upper and lower sides. Next, the inner collar member 13 is applied to the hole formed by attaching the washer member 15 from the back surface. In other words, the upper surface 133 of the locking piece 131 of the inner collar member 13 is brought into contact with the lower member of the approximately C-shaped cross section of the washer member 15. Next, the washer member 15 is pinched by a pair of locking pieces 12 and 13 of the collar member 11 by inserting the circular cylinder member 132 of the inner collar member 13 to the insertion hole 135 of the circular cylinder member 122 of the outer collar member 12, whereby the vibration proofing heat shield plate 10 is manufactured. The vibration proofing heat shield plate 10 obtained by the method mentioned above is applied, for example, so as to cover all the surface of the exhaust manifold, and next, is fastened by the bolt 17 after finely adjusting a positional relation between the bolt hole 171 of the collar member 11 and the mounting portion 18 of the exhaust manifold 20. The collar member 11 and the washer member 15 are stably fixed by fastening the bolt 17, and the collar member 11 and the exhaust manifold 20 are stably fixed thereby (refer to FIG. 1).

The vibration proofing heat shield plate main body portion 14 is supported to the collar member 11 fixed to the heat source by the spring energizing force of the approximately C-shaped cross section portion of the washer member 15. The collar member 11 is constituted by a rigid material, and is not deformed by fastening by bolt. Accordingly, the washer member 15 arranged between a pair of upper and lower locking pieces 121 and 131 does not fall away in spite that it is not fixed by welding.

In accordance with the vibration proofing heat shield plate 10 on the basis of the present embodiment, since the buffering member is constituted by three elements comprising the collar member 11, the washer member 15 and the joint member, that is, the number of the parts is small and the simple structure is obtained, a cost can be reduced. Further, since the vibration from the vibration source can be absorbed by the spring effect of the washer member, a high vibration controlling effect can be obtained. In particular, since the vibration proofing heat shield plate main body portion 14 is not in contact with the collar member 11 even if a lateral vibration is generated, no noise is generated and no damage is generated. Further, the heat conduction from the heat source can be shielded by the washer member, and a high heat shielding effect can be obtained.

The invention claimed is:

1. A vibration proofing heat shield plate fixed such as to cover at least a part of a heat source fixed to a vibration source while forming a gap with respect to a surface of said heat source for reducing a heat radiation from the heat source, comprising:
   a vibration proofing heat shield plate main body portion;
   a collar member positioned at an open hole of said vibration proofing heat shield plate main body portion and including a pair of locking pieces fastened by bolt to said heat source;
   a washer member including (1) a first portion of a flat annular shape and (2) a second portion interposed between a pair of locking pieces of said collar member formed in an approximately C-shaped cross section; and
   a joint member joining said washer member, at the first portion of said washer member, and said vibration proofing heat shield plate main body.

2. A vibration proofing heat shield plate as claimed in claim 1, wherein said washer member is structured by assembling two deformed washers each having an upward or downward bent hole side, in a vertically symmetrical shape by bringing annular flat plate portions in an outer side into contact with each other.

3. A vibration proofing heat shield plate as claimed in claim 1 or 2, wherein said heat source is constituted by an exhaust manifold of an automotive engine.

* * * * *